United States Patent
Ueno et al.

(10) Patent No.: US 11,324,097 B2
(45) Date of Patent: May 3, 2022

(54) ILLUMINATION CONTROL METHOD AND ILLUMINATION CONTROL APPARATUS

(71) Applicant: PANASONIC INTELLECTUAL PROPERTY MANAGEMENT CO., LTD., Osaka (JP)

(72) Inventors: Saori Ueno, Osaka (JP); Yu Kawase, Osaka (JP); Toshiyasu Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 276 days.

(21) Appl. No.: 16/578,121

(22) Filed: Sep. 20, 2019

(65) Prior Publication Data

US 2020/0107420 A1    Apr. 2, 2020

(30) Foreign Application Priority Data

Sep. 27, 2018 (JP) .............................. JP2018-182804

(51) Int. Cl.
H05B 47/16 (2020.01)
H05B 45/20 (2020.01)

(52) U.S. Cl.
CPC ............. *H05B 47/16* (2020.01); *H05B 45/20* (2020.01)

(58) Field of Classification Search
CPC ........ H05B 45/20; H05B 47/11; H05B 47/16; H05B 47/175; H05B 47/195
See application file for complete search history.

(56) References Cited

U.S. PATENT DOCUMENTS

| | | | | |
|---|---|---|---|---|
| 10,616,984 B2* | 4/2020 | Takeguchi | ............. | H05B 45/20 |
| 2010/0262296 A1* | 10/2010 | Davis | ..................... | H05B 47/18 |
| | | | | 700/275 |
| 2013/0229113 A1 | 9/2013 | Toda et al. | | |
| 2014/0052220 A1* | 2/2014 | Pedersen | ............... | A61M 21/00 |
| | | | | 607/88 |
| 2014/0314420 A1* | 10/2014 | De Bruijn | ............ | H04N 5/3532 |
| | | | | 398/127 |
| 2014/0375222 A1* | 12/2014 | Rains, Jr. | ................. | G06N 3/08 |
| | | | | 315/158 |
| 2016/0366746 A1* | 12/2016 | van De Ven | ........... | H05B 45/20 |
| 2017/0343197 A1* | 11/2017 | Gammons | .............. | H05B 47/18 |
| 2018/0043130 A1* | 2/2018 | Moore-Ede | .......... | H05B 47/105 |

FOREIGN PATENT DOCUMENTS

JP    2013-182820 A    9/2013

OTHER PUBLICATIONS

Jazi al Enezi, et al., "A 'Melanopic' Spectral Efficiency Function Predicts the Sensitivity of Melanopsin Photoreceptors to Polychromatic Lights", Journal of Biological Rhythms, vol. 26, No. 4, 2011, pp. 314-323.

* cited by examiner

*Primary Examiner* — Tung X Le
(74) *Attorney, Agent, or Firm* — McDermott Will & Emery LLP

(57) ABSTRACT

An illumination control method includes: causing an illumination apparatus to illuminate a predetermined space with light; and controlling at least one of a color temperature of light which the illumination apparatus emits and an illuminance of the light which the illumination apparatus emits in the predetermined space, to cause an integrated value to be at least 10 $\mu W \cdot h/cm^2$. The integrated value is a value resulting from integrating time and an effective amount of melatonin during a first time frame from 5:00 to 14:00.

20 Claims, 11 Drawing Sheets

ILLUMINATION CONTROL METHOD AND ILLUMINATION CONTROL APPARATUS

CROSS REFERENCE TO RELATED APPLICATION

This application claims the benefit of priority of Japanese Patent Application Number 2018-182804 filed on Sep. 27, 2018, the entire content of which is hereby incorporated by reference.

BACKGROUND

1. Technical Field

The present disclosure relates to an illumination control method and an illumination control apparatus.

2. Description of the Related Art

Conventionally, researches have been conducted on influences which illumination has on a living body. Japanese Unexamined Patent Application Publication No. 2013-182820 discloses an illumination control apparatus which achieves a balance between energy conservation and light environment suitable for a biorhythm, at a workplace during working hours.

SUMMARY

An aspect of the present disclosure provides an illumination control method and an illumination control apparatus which can increase an amount of melatonin that is effective for a user, and can adjust a biorhythm of the user.

An illumination control method according to an aspect of the present disclosure includes: causing an illumination apparatus to illuminate a predetermined space with light; and controlling at least one of a color temperature of light which the illumination apparatus emits and an illuminance of the light which the illumination apparatus emits in the predetermined space, to cause an integrated value to be at least 10 $\mu W \cdot h/cm^2$, the integrated value being a value resulting from integrating time and an effective amount of melatonin during a first time frame from 5:00 to 14:00.

A non-transitory computer-readable recording medium for use in a computer, the recording medium having a computer program recorded thereon for causing the computer to execute the illumination control method according to an aspect of the present disclosure.

An illumination control apparatus according to an aspect of the present disclosure includes: an illumination control unit configured to control at least one of a color temperature of light which an illumination apparatus emits and an illuminance of the light which the illumination apparatus emits in a predetermined space, to cause an integrated value to be at least 10 $\mu W \cdot h/cm^2$, the integrated value being a value resulting from integrating time and an effective amount of melatonin during a first time frame from 5:00 to 14:00.

An illumination system according to an aspect of the present disclosure can increase an amount of melatonin that is effective for a user, and can adjust a biorhythm of the user.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments will be described with reference to the drawings. Note that the embodiments below each describe a general or specific example. The numerical values, shapes, materials, elements, the arrangement and connection of the elements, steps, and the processing order of the steps, etc. presented in the embodiments below are mere examples and do not limit the present disclosure. Furthermore, among the structural elements in the embodiments below, those not recited in any one of the independent claims will be described as optional structural elements.

Note that the drawings are schematic diagrams, and do not necessarily provide strictly accurate illustration. Furthermore, throughout the drawings, the same reference signs are given to essentially the same structural elements, and redundant descriptions may be omitted or simplified.

Embodiment

[Outline of Illumination System]

Figure 1:
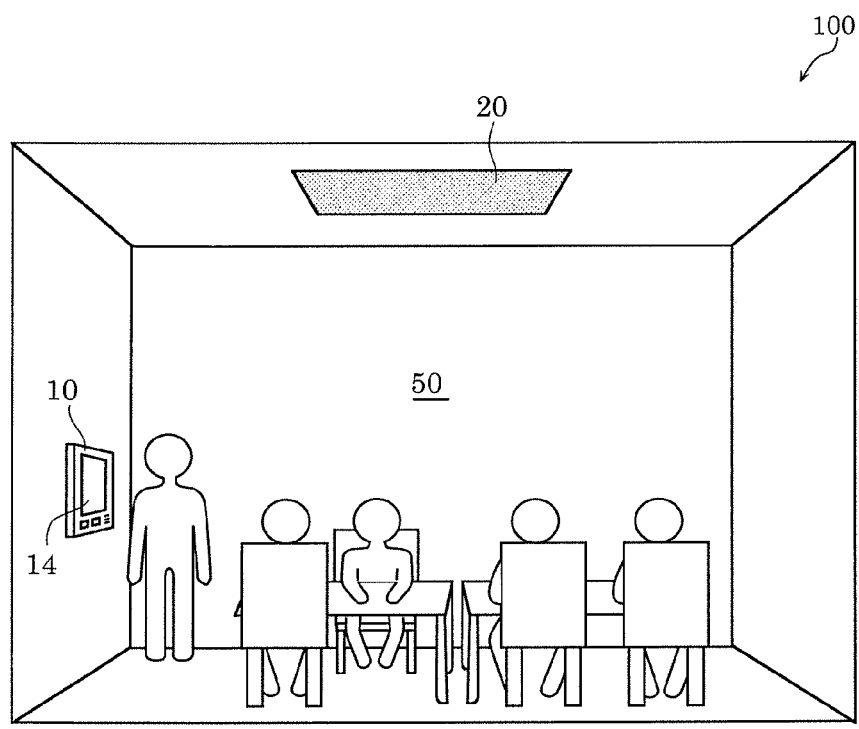
FIG. 1 is a diagram illustrating an overview of an illumination system according to an embodiment.
Figure 2:
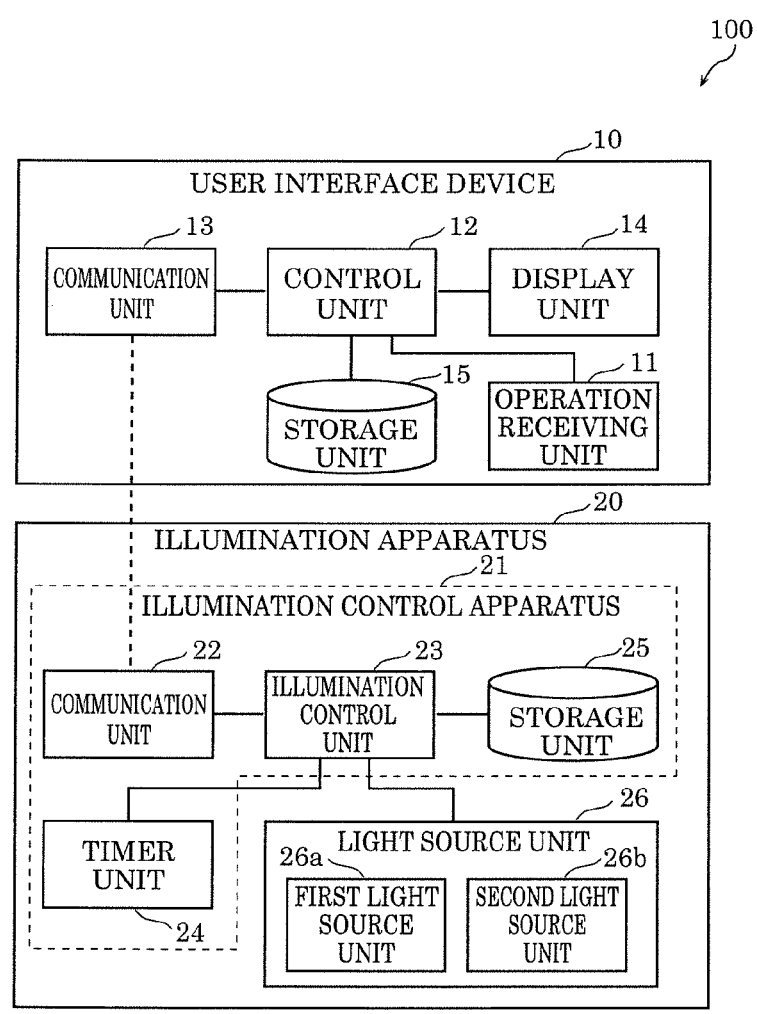
FIG. 2 is a block diagram illustrating a functional configuration of the illumination system according to the embodiment.

First, the whole configuration of an illumination system according to an embodiment will be described. FIG. 1 is a diagram illustrating an overview of an illumination system according to an embodiment. FIG. 2 is a block diagram illustrating a functional configuration of the illumination system according to the embodiment.

Illumination system 100 illustrated in FIG. 1 and FIG. 2 is a system which illuminates predetermined space 50 in which a plurality of users can stay at the same time, such as a lounge or a dining hall in a welfare institution for the aged and the like. Note that predetermined space 50 may be a private place, such as a home. Illumination system 100 includes user interface device 10 and illumination apparatus 20.

Specifically, illumination system 100 includes four operation modes which correspond to four time frames. The four operation modes include: (i) a morning mode which corresponds to a first time frame from 5:00 to 14:00; (ii) an afternoon mode which corresponds to a fourth time frame from 14:00 to 17:00; (iii) an evening mode which corresponds to a second time frame from 17:00 to 20:00; and (iv) a night mode which corresponds to a third time frame from 20:00 onward.

A setter (for example, a nursing care staff of a welfare institution for the aged) can set a schedule on how illumination apparatus 20 is to emit light during each of the four operation modes. Here, in consideration of a biorhythm of a user of the institution, there is a certain limitation imposed on a schedule setting.

Previous researches have revealed that exposure to bright light during daytime adjusts a biorhythm, and this makes it possible to have good quality sleep at night. However, since it is infrequent for a user of an institution, such as a welfare institution for the aged, to go outside, the user has little opportunity to be exposed to natural light during the daytime. This may disrupt a biorhythm of the user, and may disturb the user from having good quality sleep.

Consequently, illumination system 100 only allows the schedule setting that is capable of increasing an effective amount of melatonin to be set for the morning mode to make up for a deficiency in the amount of light that a user is exposed to during the daytime. This enables illumination system 100 to make up for, using illumination light which illumination apparatus 20 emits, the deficiency in the amount of light that the user of the institution is exposed to during the daytime, and to improve the biorhythm of the user of the institution.

Note that, in general, the effective amount of melatonin increases as an illuminance increases, and the effective amount of melatonin increases as a color temperature (for example, a correlated color temperature) increases. The effective amount of melatonin can be calculated, based on the amount of light which illumination apparatus 20 emits and the emission spectrum of the light, using the model established by Enezi and others (see Enezi, J. al, Revell, V., Brown, T., Wynne, J., Schlangen, L., & Lucas, R. (2011). A "Melanopic" spectral efficiency function predicts the sensitivity of melanopsin photoreceptors to polychromatic lights. *Journal of Biological Rhythms*, 26, 4, 314-323).

In addition, in order to increase the effective amount of melatonin, white light having the amount of light which is about 5 to 10 times greater than a normal illumination has is used. Such light may be glaring and unpleasant for an elderly person, such as a user who has a cataract. Therefore, in illumination system 100, there is a limitation imposed on the schedule setting in consideration of providing comfort for the user. Hereinafter, a detailed configuration of each of devices included in illumination system 100 will be described with reference to FIG. 1 and FIG. 2.

[User Interface Device]

First, user interface device 10 will be described. User interface device 10 is a device which a nursing care staff of an institution or a user of the institution operates to control illumination apparatus 20. User interface device 10 is a dedicated device for illumination system 100, and is provided in predetermined space 50, for example. User interface device 10 may be provided in another place other than predetermined space 50. User interface device 10 may be realized by a dedicated application that is installed in a general-purpose device, such as a smartphone or a tablet terminal. User interface device 10 includes operation receiving unit 11, control unit 12, communication unit 13, display unit 14, storage unit 15, and timer unit 16.

Operation receiving unit 11 receives operation, such as start operation for starting the operation of illumination apparatus 20, stop operation for stopping the operation of illumination apparatus 20, and setting operation for a schedule setting. Operation receiving unit 11 is realized by, for example, a touch panel and a hardware button.

Control unit 12 stores, in storage unit 35, schedule setting information for each of the four operation modes described above, and uses communication unit 13 to transmit the schedule setting information to illumination apparatus 20.

In addition, control unit 12 causes communication unit 13 to transmit a start indication signal after operation receiving unit 11 receives the start operation. This makes illumination apparatus 20 to start scheduled operation. In addition, control unit 12 causes communication unit 13 to transmit a stop indication signal after operation receiving unit 11 receives the stop operation. This makes illumination apparatus 20 to stop the scheduled operation. Specifically, control unit 12 is realized by a microcomputer, but control unit 12 may be realized by a processor, for example.

Communication unit 13 transmits the schedule setting information, the start indication signal, and the stop indication signal to illumination apparatus 20, based on the control of control unit 12. Communication unit 13 is specifically a communication circuit (in other words, a communication module) for illumination apparatus 20 to communicate with user interface device 10. The communication performed by communication unit 13 may be wired communication or wireless communication. The communication standard used for the communication is not particularly limited.

Display unit 14 displays, based on the control of control unit 12, a display screen which a setter visually confirms for the schedule setting. Display unit 14 is realized by a liquid crystal panel or an organic electroluminescent (EL) panel, for example.

Storage unit 15 is a storage device in which control unit 12 stores the schedule setting information. Storage unit 15 also stores a control program executed by control unit 12. In addition, when user interface device 10 is realized by a general-purpose information terminal, such as a smartphone or a tablet terminal, a dedicated application program for operating the general-purpose information terminal is installed in storage unit 15. Specifically, storage unit 15 is realized by a semiconductor memory, for example.

[Illumination Apparatus]

Illumination apparatus 20 is a device which illuminates the inside of predetermined space 50. Illumination apparatus 20 includes illumination control apparatus 21 and light source unit 26.

Illumination control device 21 is a control device which controls light which light source unit 26 emits. Illumination control device 21 includes communication unit 22, illumination control unit 23, timer unit 24, and storage unit 25.

Communication unit 22 receives schedule setting information, a start indication signal, and a stop indication signal which are transmitted by user interface device 10. Communication unit 22 is specifically a communication circuit (in other words, a communication module) for illumination apparatus 20 to communicate with user interface device 10. The communication performed between illumination apparatus 20 and user interface device 10 may be wired communication or wireless communication. The communication standard used for the communication is not particularly limited.

Illumination control unit 23 stores the schedule setting information which is received by communication unit 22 into storage unit 25. Then, after communication unit 22 receives the start indication signal, illumination control unit 23 controls, based on the schedule setting information stored in storage unit 25, light which light source unit 26 emits. Specifically, illumination control unit 23 controls at least one of the illuminance of light which illumination apparatus 20 emits in predetermined space 50 and the color temperature of the light which light source unit 26 emits. Illumination control unit 23 may be realized by a processor, a microcomputer, or a dedicated circuit, for example. Note that the schedule setting information is information indicating a correspondence between time and the intensity of light (in other words, brightness) which light source unit 26 emits at the time, and a correspondence between time and the color temperature of the light which light source unit 26 emits. Illumination control unit 23 reads and uses the schedule setting information stored in storage unit 25.

Timer unit 24 is a timer which measures the present time, and notifies the measured time to illumination control unit 23. Timer unit 24 is used in order for illumination control unit 23 to cause light source unit 26 to emit light according to a light emission schedule. Timer unit 24 is specifically a real-time clock, but timer unit 24 may be any type of a clock, for example.

Storage unit 25 is storage into which the schedule setting information and the like are stored. Storage unit 25 is specifically realized by a semiconductor memory, for example.

Light source unit 26 is a light source controlled by illumination control unit 23. Light source unit 26 is a base light which is attached to the ceiling that defines predetermined space 50 to illuminate predetermined space 50. Light source unit 26 emits white light. Light source unit 26 is the base light having a quadrilateral shape when seen in plan view, but it may have a circular shape when seen in plan view. Light source unit 26 may even be a ceiling light, a downlight, or a spotlight, for example.

Illumination control device 21 performs dimming control on light which light source unit 26 emits. In addition, illumination control device 21 performs toning control on the light which light source unit 26 emits. Specifically, light source unit 26 includes first light source 26a that emits light having a first color temperature (for example, 2000 K), and second light source 26b that emits light having a second color temperature (for example, 10000 K) which is higher than the first color temperature. First light source 26a and second light source 26b are surface mount device (SMD)-type light emitting modules each of which uses a light-emitting diode (LED) as a light emitting element, for example, but first light source 26a and second light source 26b may be chip-on-board (COB)-type light emitting modules. Illumination control device 21 tones light by independently controlling the intensity of light which first light source 26a emits and the intensity of light which second light source 26b emits.

[Operation for Schedule Setting]

Figure 3:
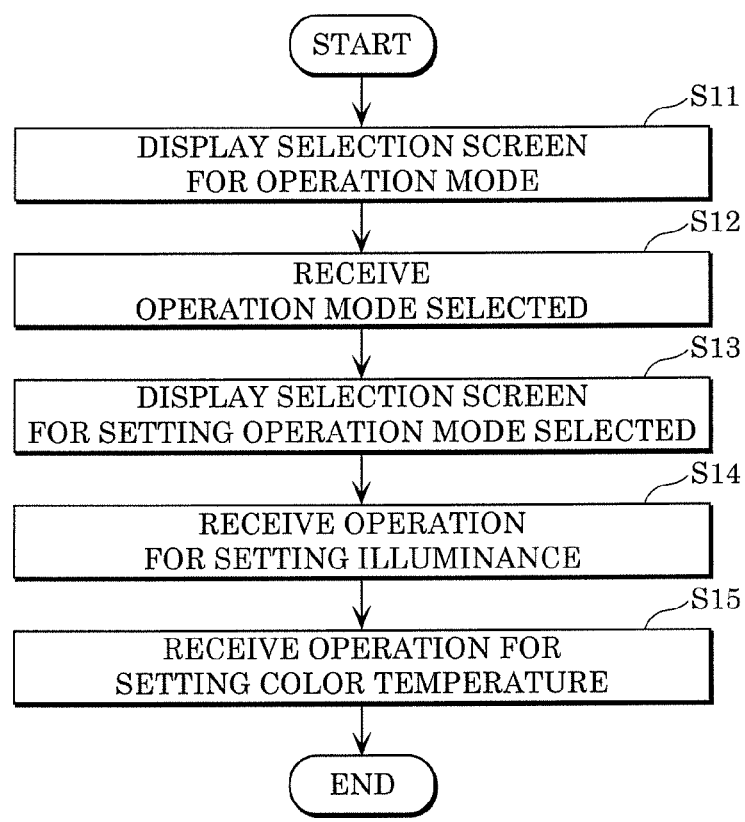
FIG. 3 is a flowchart illustrating operation for a schedule setting using a user interface device.

Next, operation for a schedule setting using user interface device 10 will be described. FIG. 3 is a flowchart illustrating operation for a schedule setting using user interface device 10.

Figure 4:
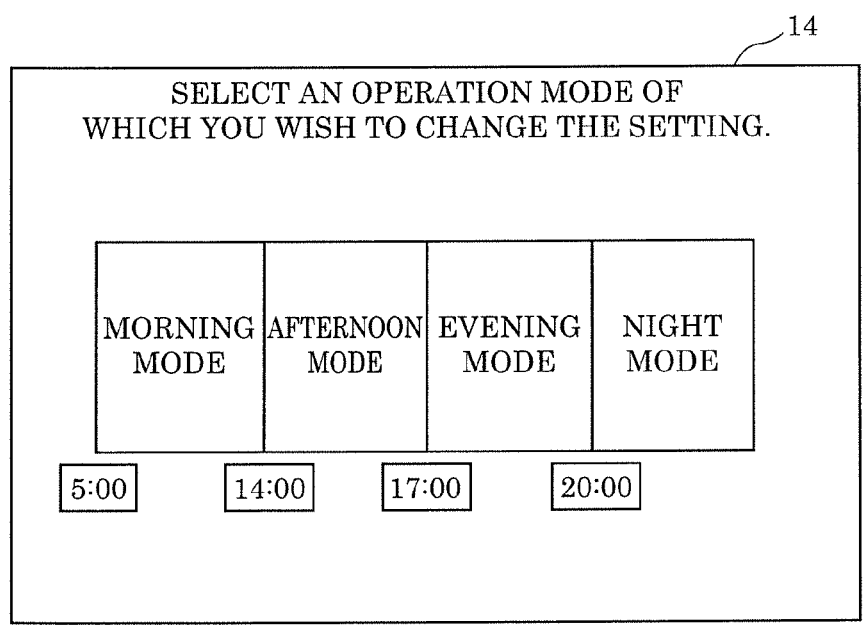
FIG. 4 is a diagram illustrating an example of a selection screen for an operation mode.

First, display unit 14 displays a selection screen for an operation mode based on the control of control unit 12 (S11). FIG. 4 is a diagram illustrating an example of a selection screen for an operation mode. The selection screen for an operation mode is a display screen for a setter to select an operation mode which is to be set. As illustrated in FIG. 4, the selection screen for an operation mode displays four selectable operation modes each with the start time and the end time. This enables the setter to readily grasp in which time frame each of the four operation modes will be performed.

Figure 5:
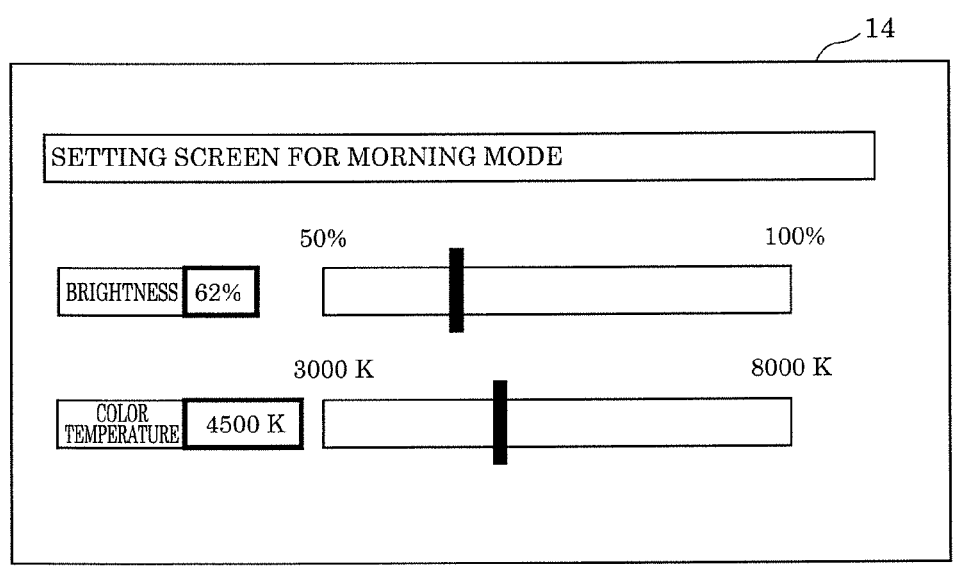
FIG. 5 is a diagram illustrating an example of a setting screen for a morning mode.

Next, operation receiving unit 11 receives an operation mode selected by the setter (S12). Display unit 14 displays a setting screen for the operation mode selected based on the control of control unit 12 (S13). For example, when operation for the morning mode which is selected by the setter is received, display unit 14 displays the setting screen for the morning mode. FIG. 5 is a diagram illustrating an example of a setting screen for the morning mode.

As illustrated in FIG. 5, the setting screen for the morning mode displays the name of the operation mode, the present value that is set for the intensity of light which illumination apparatus 20 emits during the morning mode, and the present value that is set for the color temperature of the light which illumination apparatus 20 emits during the morning mode.

Figure 6:
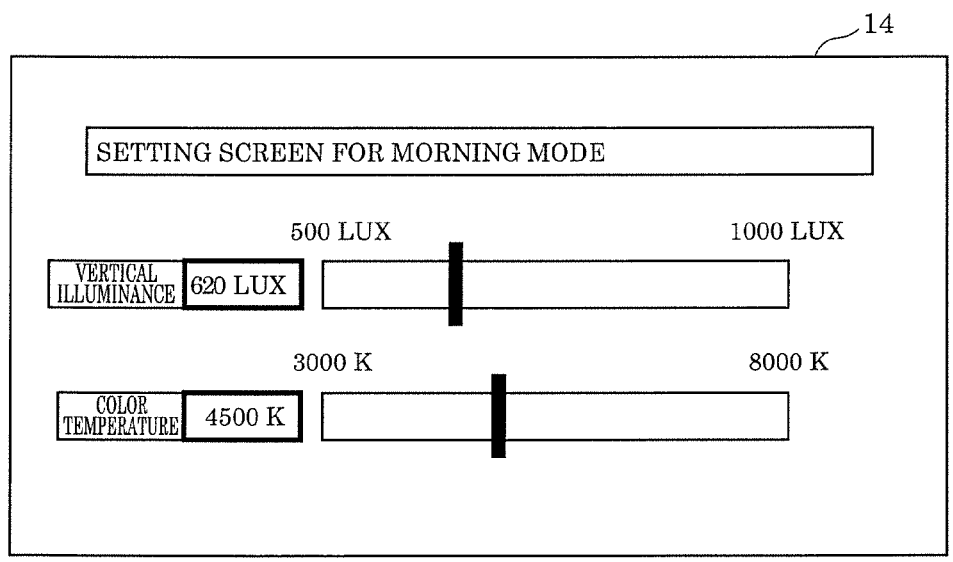
FIG. 6 is a diagram illustrating a setting screen for the morning mode in which a value that is set for light intensity is represented as a vertical illuminance.
Figure 7:
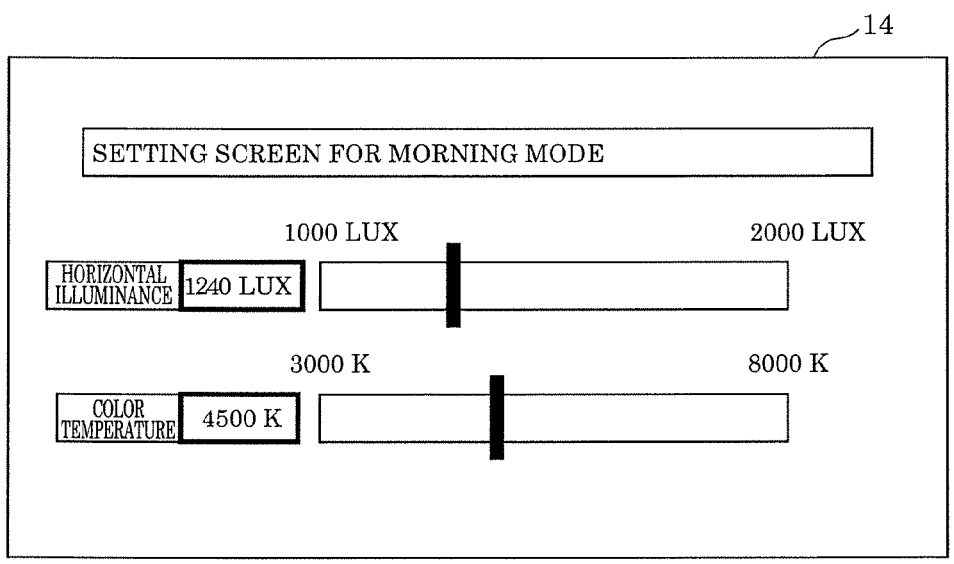
FIG. 7 is a diagram illustrating a setting screen for the morning mode in which a value that is set for the light intensity is represented as a horizontal illuminance.

The value that is set for the intensity of light which illumination apparatus 20 emits in the example illustrated in FIG. 5 is represented as brightness (more specifically, a dimming factor). However, it is to be noted that the value can be represented as a vertical illuminance (more specifically, an illuminance on a face) in predetermined space 50 or as a horizontal illuminance (more specifically, an illuminance on a desk surface) in predetermined space 50. FIG. 6 is a diagram illustrating a setting screen for the morning mode in which a value that is set for light intensity is represented as a vertical illuminance. FIG. 7 is a diagram illustrating a setting screen for the morning mode in which a value that is set for light intensity is represented as a horizontal illuminance. The dimming factor is converted into the horizontal illuminance or a vertical illuminance by using, for example, the predetermined conversion formula which is stored in storage unit 15.

Note that display unit 14 is to display, on the setting screen, at least one of the dimming factor, the horizontal illuminance, and the vertical illuminance. In addition, the setting screen may simultaneously display, as values to be set for the light intensity, two or more values among the dimming factor, the horizontal illuminance, and the vertical illuminance. In the following embodiment, the light intensity is represented as the vertical illuminance (or merely indicated as an illuminance).

Next, operation receiving unit 11 receives operation for setting an illuminance that is set by the setter (S14). The operation for setting the illuminance is, for example, a drag and drop operation in which a lever indicating the present illuminance shown in the setting screen that is illustrated in FIG. 6 is slid to left and right.

Next, operation receiving unit 11 receives operation for setting a color temperature that is set by the setter (S15). The operation for setting the color temperature is, for example, a swipe operation in which a lever indicating the present color temperature in the setting screen that is illustrated in FIG. 6 is slid to left and right.

[Limitation Imposed on Morning Mode Setting]

There is a limitation imposed on the illuminance setting for the morning mode to maintain the effective amount of melatonin high. Specifically, the illuminance is only allowed to be set to at least 500 lux. For the schedule setting, a limitation may be imposed such that an integrated value resulting from integrating time and the effective amount of melatonin during the first time frame to be at least 10 $\mu W \cdot h/cm^2$. The integrated value represents the amount of melatonin that is effective for a user when the user is exposed to light having a color temperature of 3000 K and an illuminance of 500 lux, which has, as the norm, the effective amount of melatonin is 41 $\mu W/cm^2$, for at least 15 minutes (0.25 hours).

Figure 8:
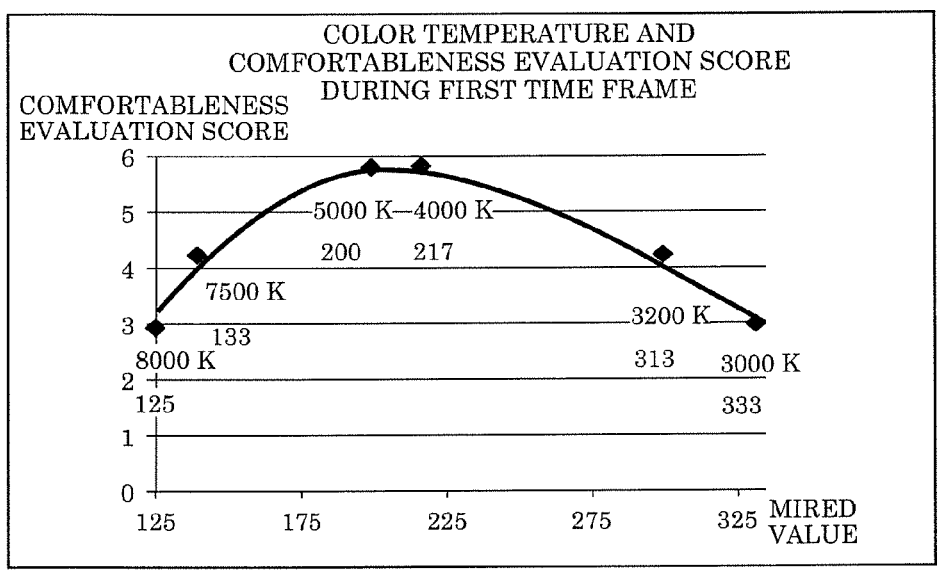
FIG. 8 is a diagram illustrating a relationship between a color temperature of light which an illumination apparatus emits and a comfortableness evaluation score evaluated during the first time frame which corresponds to the morning mode.

Furthermore, in consideration of providing comfort for a user, a limitation is imposed on a color temperature setting for the morning mode. FIG. 8 is a diagram illustrating a relationship between a color temperature of light which illumination apparatus 20 emits and a comfortableness evaluation score evaluated during the first time frame (from 5:00 to 14:00) which corresponds to the morning mode. The comfortableness evaluation scores indicate results of subjective evaluations conducted by about 30 elderly people on the degree of comfort provided for the elderly people.

In order to improve the effective amount of melatonin, predetermined space 50 needs to be illuminated by bright light during the morning mode, but such bright light is too glaring for an elderly person who has a clouded crystalline lens. Meanwhile, as illustrated in FIG. 8, the degree of comfort provided for the elderly person changes based on the color temperature of light emitted by illumination apparatus 20. Accordingly, a limitation imposed on the color temperature prevents a user from feeling unpleasant due to glare, thereby improving the degree of comfort provided for the user.

In order to maintain the comfortableness evaluation scores illustrated in FIG. 8 high, the predetermined color temperature range set for the morning mode is limited to at least 3000 K and at most 8000 K. This ensures at least three points of the comfortableness evaluation score, and thus light having a color temperature which an elderly person feels unpleasant is prevented from emitting by illumination device 20 during the first time frame. Note that, in order to maintain the comfortableness evaluation score even higher, the color temperature of light which illumination apparatus 20 emits during the first time frame may be limited to at least 3200 K and at most 7500 K. This ensures at least four points of the comfortableness evaluation score. In order to maintain the comfortableness evaluation score very high, the color temperature of light which illumination apparatus 20 emits during the first time frame may be limited to at least 4000 K and at most 5000 K. This ensures approximately six points of the comfortableness evaluation score.

[Limitation Imposed on Evening Mode Setting]

Figure 9:
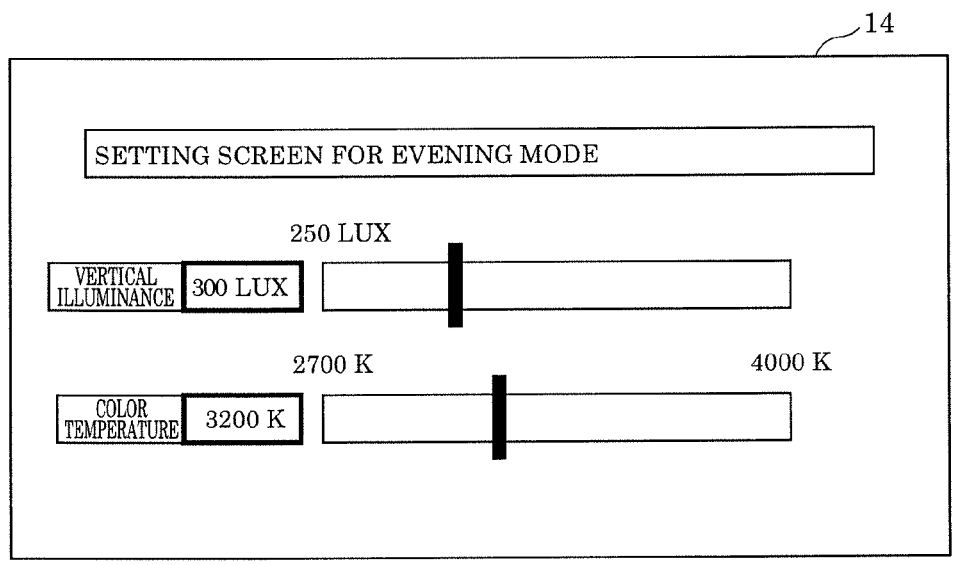
FIG. 9 is a diagram illustrating an example of a setting screen for an evening mode.

Although the above has only described limitations imposed on the morning mode setting, there are limitations imposed on the other operation modes. First, a limitation imposed on the evening mode setting will be described. FIG. 9 is a diagram illustrating an example of a setting screen for the evening mode.

As illustrated in FIG. 9, a setting screen for the evening mode displays the name of the operation mode, the present value that is set for the intensity of light which illumination apparatus 20 emits during the evening mode, and the present value that is set for the color temperature of light which illumination apparatus 20 emits during the evening mode.

Here, in order to adjust a biorhythm, it is necessary to reduce the effective amount of melatonin during a second time frame from 17:00 to 20:00 which corresponds to the evening mode. That is to say, predetermined space 50 needs to be illuminated by comparatively dim light during the evening mode. However, since the entirety of predetermined space 50 seems yellowish and gloomy for an elderly person who has a clouded and yellowed crystalline lens, the elderly person may feel much more oppressive than the younger generation feels if predetermined space 50 is too dimly illuminated.

Accordingly, the minimum value is determined for the illuminance setting for the evening mode. Specifically, the illuminance is only allowed to be set to at least 200 lux. This prevents the user from feeling oppressive during the second time frame. Note that although there is no particular limit to the maximum value, the maximum value may be 500 lux may, for example.

Figure 10:
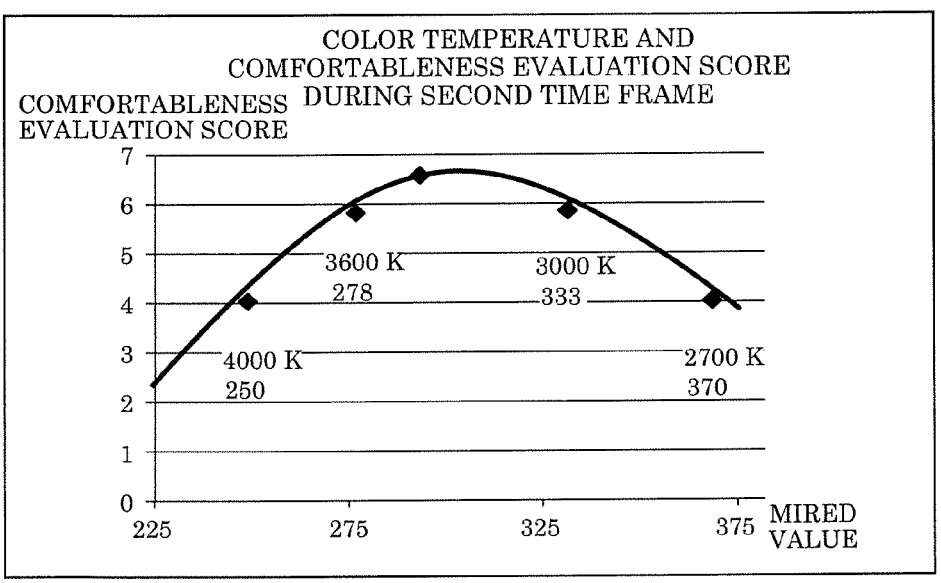
FIG. 10 is a diagram illustrating a relationship between a color temperature of light which an illumination apparatus emits and a comfortableness evaluation score evaluated during the second time frame which corresponds to the evening mode.

Furthermore, in consideration of providing comfort for the user, a limitation is also imposed on the color temperature setting for the evening mode. FIG. 10 is a diagram illustrating a relationship between a color temperature of light which illumination apparatus 20 emits and a comfortableness evaluation score during the second time frame (from 17:00 to 20:00) which corresponds to the evening mode. The comfortableness evaluation scores indicate results of subjective evaluations conducted by about 30 elderly people on the degree of comfort provided for the elderly people.

As illustrated in FIG. 10, the degree of comfort provided for an elderly person changes based on the color temperature of light emitted during the second time frame. Accordingly, a limitation imposed on the color temperature can improve the degree of comfort provided for the user.

In order to maintain the comfortableness evaluation scores illustrated in FIG. 10 high, the predetermined color temperature range set for the evening mode may be limited to at least 2700 K and at most 4000 K. This ensures at least four points of the comfortableness evaluation score, and thus light having a color temperature which the elderly person feels unpleasant is prevented from emitting by illumination apparatus 20 during the second time frame. Note that, in order to maintain the comfortableness evaluation score even higher, the color temperature of light emitted by illumination apparatus 20 during the second time frame may be limited to at least 3000 K to at most 3600 K. This ensures approximately six points of the comfortableness evaluation score.

[Limitation Imposed on Night Mode Setting]

Next, a limitation imposed on a night mode setting will be described. In order to adjust a biorhythm, bright light may not be exposed to the user during a third time frame from 20:00 onward which corresponds to the night mode. Exposure to bright light during a time frame before bedtime, such as the third time frame, has adverse effects on the ability to fall asleep and on the quality of the sleep.

Accordingly, the maximum value is determined for the illuminance that is set for the night mode. Specifically, the illuminance is only allowed to be set below 200 lux.

In addition, light having a comparatively low color temperature reduces the inhibition of melatonin secretion during the time frame before bedtime, such as the third time frame, and exerts positive effects on the ability to fall asleep and on the quality of the sleep. Consequently, the color temperature that is set for the night mode is only allowed to be set below the color temperature set for the evening mode. For example, when the color temperature that is set for the evening mode is 3000 K, the color temperature that is set for the night mode is only allowed to be set below 3000 K.

[Limitation Imposed on Afternoon Mode Setting]

Next, a limitation imposed on the afternoon mode setting will be described. The illuminance that is set for a fourth time frame from 14:00 to 17:00 which corresponds to the afternoon mode is limited to, for example, an illuminance below the illuminance that is set for the morning mode. For example, when the illuminance that is set for the morning mode is 750 lux, the illuminance that is set for the afternoon mode is only allowed to be set below 750 lux.

In addition, for the fourth time frame, the color temperature of light which illumination apparatus 20 emits is limited to, for example, a color temperature below the color temperature that is set for the morning mode. For example, when the color temperature that is set for the morning mode is 5000 K, the color temperature that is set for the afternoon mode is only allowed to be set below 5000 K.

[Scheduled Operation]

Figure 11:
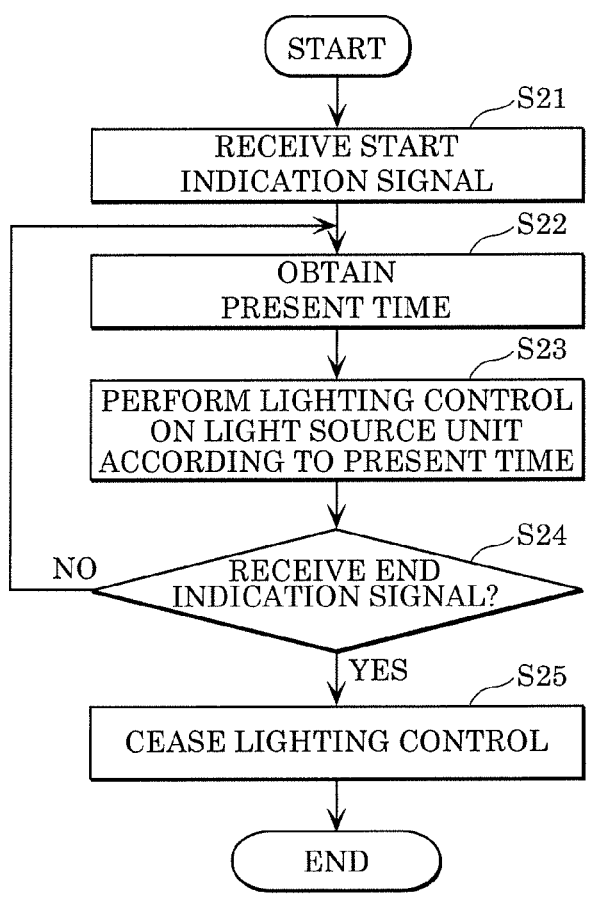
FIG. 11 is a flowchart illustrating scheduled operation performed by an illumination control apparatus.

After the schedule setting completes as described above, schedule setting information is transmitted from user interface device 10 to illumination control apparatus 21, and is stored into storage unit 25. Hereinafter, scheduled operation performed by illumination system 100 using the schedule setting information will be described. FIG. 11 is a flowchart illustrating scheduled operation performed by illumination control apparatus 21.

Communication unit 22 included in illumination control apparatus 21 receives a start indication signal (S21). The start indication signal is transmitted by communication unit 13 upon operation receiving unit 11 included in user interface device 10 receiving start operation as a trigger.

After step S21, illumination control unit 23 obtains the present time which timer unit 24 measures (S22), and performs lighting control on light source unit 26 according to the present time obtained (S23). Specifically, illumination control unit 23 can identify the value that is set for the color temperature at the present time and the value that is set for the illuminance at the present time, by referring to the schedule setting information stored in storage unit 25.

In addition, illumination control unit 23 determines whether an end indication signal is received by communication unit 22 during the lighting control (S24). When it is determined that the end indication signal is not received by communication unit 22 (NO in S24), illumination control unit 23 continues to obtain the present time, and to perform the lighting control. On the contrary, when it is determined that the end indication signal is received by communication unit 22 (YES in S24), illumination control unit 23 ceases the lighting control (S25).

Figure 12:
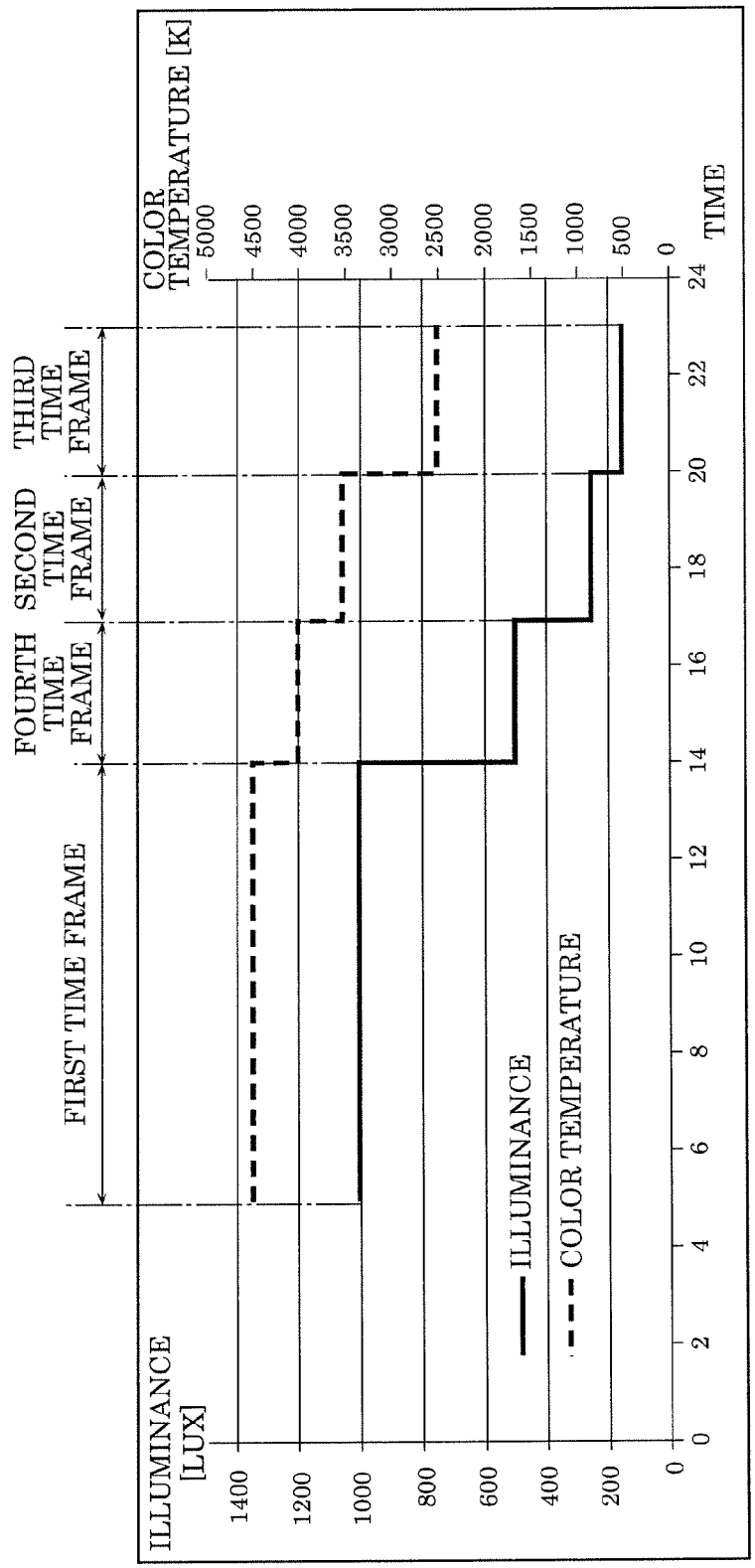
FIG. 12 illustrates an example of a time chart showing a color temperature and an illuminance of light controlled based on schedule setting information.

FIG. 12 illustrates an example of a time chart showing a color temperature and an illuminance of light controlled (that is, the lighting control performed in step S23) based on schedule setting information.

As illustrated in FIG. 12, illumination control unit 23 which is included in illumination control apparatus 21 controls the color temperature of light which illumination apparatus 20 (in other words, light source unit 26) emits and the illuminance in predetermined space 50 to cause the color temperature to be at least 3000 K and at most 8000 K during the first time frame from 5:00 to 14:00, and the illuminance to be at least 500 lux during the first time frame from 5:00 to 14:00. That is to say, during the first time frame, the color temperature of light which illumination apparatus 20 emits is at least 3000 K and at most 8000 K, and the illuminance in predetermined space 50 is at least 500 lux.

Accordingly, it is possible to improve the degree of comfort provided for a user while increasing the amount of melatonin that is effective for the user. Note that when the color temperature of light which illumination apparatus 20 emits during the first time frame is at least 3200 K and at most 7500 K, it is possible to further improve the degree of comfort provided for the user. When the color temperature of light which illumination apparatus 20 emits during the first time frame is at least 4000 K and at most 5000 K, it is possible to greatly improve the degree of comfort provided for the user.

In addition, during the second time frame from 17:00 to 20:00, illumination control unit 23 controls the color temperature of light which illumination apparatus 20 emits and the illuminance in predetermined space 50 to cause the color temperature to be at least 2700 K and at most 4000 K, and the illuminance to be at least 250 lux.

This prevents the user from feeling a gloomy atmosphere, thereby improving the degree of comfort provided for the user. Note that when the color temperature of light which illumination apparatus 20 emits during the second time frame is at least 3000 K and at most 3600 K, it is possible to further improve the degree of comfort provided for the user.

In addition, during the third time frame from 20:00 onward, illumination control unit 23 controls the color temperature of light which illumination apparatus 20 emits and the illuminance in predetermined space 50 to cause the color temperature to be below the color temperature of the light during the second time frame, and the illuminance to be below 200 lux.

This light emission that is comparatively dim reduces a possibility of exerting adverse effects on the ability to fall asleep and on the quality of the sleep. The light emission that is comparatively dim also reduces the inhibition of melatonin secretion. That is to say, the light emission that is comparatively dim exerts positive effects on the ability to fall asleep and on the quality of the sleep.

In addition, during the fourth time frame that is before the second time frame and is after the first time frame, illumination control unit 23 controls the color temperature of light which illumination apparatus 20 emits to cause the color temperature to be below the color temperature of the light during the first time frame, and to be at least the color temperature of the light during the second time frame. Furthermore, illumination control unit 23 controls the illuminance in a predetermined space to cause the illuminance to be below the illuminance of the light during the first time frame, and at least the illuminance of the light during the second time frame.

This sets the illuminance and the color temperature during the fourth frame time that is between the first time frame and the second time frame to be in between the illuminance and the color temperature during the first time frame and the illuminance and the color temperature during the second time frame, thereby preventing the user from feeling unpleasant.

Note that in FIG. 12, the illuminance and the color temperature in each time frame is controlled so that the illuminance and the color temperature remain invariant. However, the illuminance and the color temperature in each time frame may change at a specified time so long as the illuminance and the color temperature are within respective predetermined ranges set for each time frame.

In addition, between time frames, an illuminance and a color temperature are to be changed gradually within the respective predetermined ranges so that the transitions from a time frame to another time frame are made smoothly. This is also effective in improving the degree of comfort provided for a user because the user does not have to undergo a rapid change. For example, it may take about a minute to two hours to linearly change (or gradually change, but not too far from being linear) from the values set for the first time frame to the values set for the fourth time frame.

[Effect]

Figure 13:
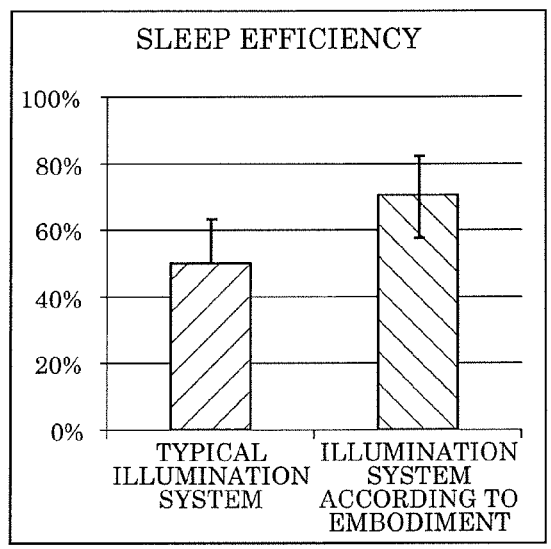
FIG. 13 is a diagram illustrating sleep efficiency of a user of a typical illumination system, and sleep efficiency of a user of the illumination system according to the embodiment.

If the lighting control described above is performed during the first time frame and the second time frame, it is possible to improve the biorhythm and the sleep quality of a user. FIG. 13 is a diagram illustrating sleep efficiency of a user of a typical illumination system, and sleep efficiency of a user of illumination system 100.

In FIG. 13, bar graphs illustrate sleep efficiency. The sleep efficiency is a physical quantity which indicates the percentage of actual time a user had slept after lights are out (that is, the time frame which the user should be sleeping) in the institution. Line graphs in FIG. 13 illustrate the standard deviations of the sleep efficiency.

As illustrated in FIG. 13, the sleep efficiency of the user of illumination system 100 is greater than the sleep efficiency of the user of the typical illumination system. That is to say, illumination system 100 can improve the sleep quality of the user.

Figure 14:
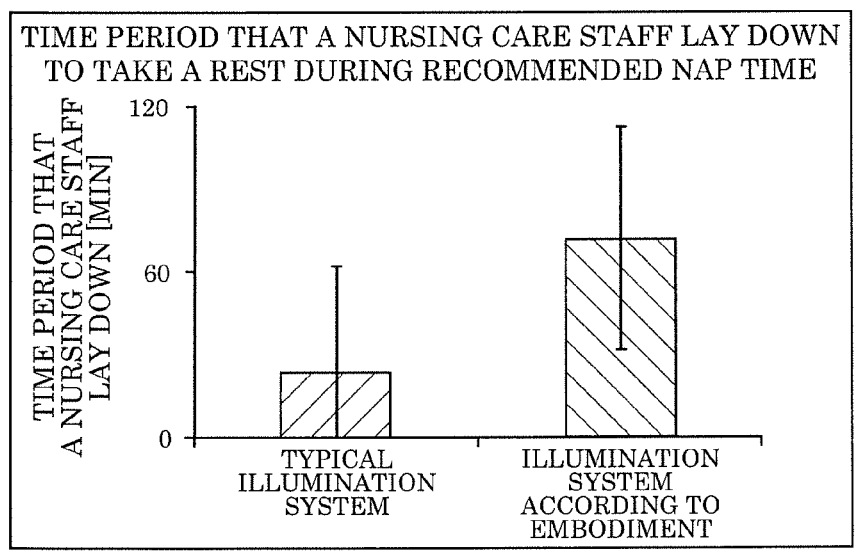
FIG. 14 is a diagram illustrating how long a nursing care staff was able to lie down to take a rest during a time frame in a late-night time frame in which a nap is recommended.

In addition, the improvement in the sleep quality of the user reduces the burden of nursing the user (that is, the load of nursing works) which is put on a nursing care staff. FIG. 14 is a diagram illustrating how long a nursing care staff was able to lie down to take a rest during a late-night time frame (a break of about two hours) in which a nap is recommended.

FIG. 14 illustrates how long a nursing care staff was able to lie down to take a rest during the late-night time frame in which a nap is recommended. Line graphs indicate standard deviations. As illustrated in FIG. 14, the time a nursing care staff of an institution where a typical illumination system is provided has taken to actually lie down (that is, to be able to take a rest) is shorter than the time a nursing care staff of an institution where illumination system 100 is provided has taken. That is to say, since the user of the institution where illumination system 100 is provided sleeps well most of the time, it is not often for the nursing care staff to attend to an irregular duty in late-night hours. Accordingly, illumination system 100 can yield an effect that reduces the burden of nursing which is put on the nursing care staff.

[Variation]

Figure 15:
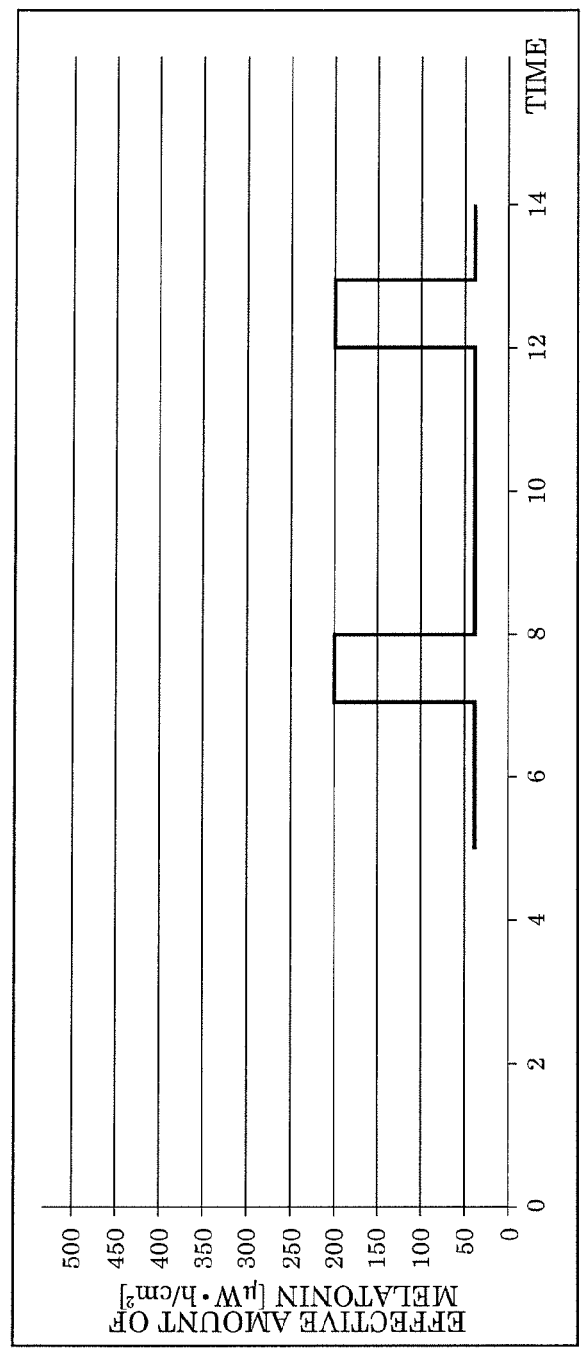
FIG. 15 is a time chart illustrating lighting control in which an effective amount of melatonin varies during the first time frame.

In the time chart illustrated in FIG. 12, the illuminance in predetermined space 50 during the first time frame and the color temperature of light which illumination apparatus 20 emits during the first time frame remain invariant. In this case, the effective amount of melatonin during the first time frame also remains invariable. However, during the first time frame, each of the illuminance in predetermined space 50 and the color temperature of light which illumination apparatus 20 emits may vary so long as the integrated value resulting from integrating time and the effective amount of melatonin is ensured to be at least 10 $\mu W \cdot h/cm^2$. That is to say, the effective amount of melatonin during the first time frame may vary. FIG. 15 is a time chart illustrating lighting control in which the effective amount of melatonin varies during the first time frame.

Like the embodiment described above, the lighting control as illustrated in FIG. 15 is realized by settings that are preset via user interface device 10. User interface device 10 imposes basically the same limitations on the settings as the embodiment described above has imposed on the settings. Specifically, user interface device 10 receives the setting for the color temperature of light which illumination apparatus 20 emits during the first time frame within a predetermined color temperature range (for example, at least 3000 K and at most 8000 K), and the setting for the illuminance in predetermined space 50 during the first time frame within a predetermined illuminance range (for example, at least 500 lux).

However, during presetting, when a time period in which illumination apparatus 20 emits light according to the limitations described above is provided longer than the predetermined time period in the first time frame (for example, when a time period in which an integrated value resulting from integrating time and the effective amount of melatonin is at least 10 $\mu W \cdot h/cm^2$ is provided longer the predetermined time period), a setter can freely set the color temperature and the illuminance for the remaining time period of the first time frame. That is to say, for the remaining time period, the color temperature of light which illumination apparatus 20 emits is allowed to be set to a color temperature out of the predetermined color temperature range described above, and the illuminance in predetermined space 50 is allowed to be set to an illuminance out of the predetermined illuminance range described above. Note that the predetermined time period is, for example, a time period of at least 15 minutes.

The settings which are limited as described above enable flexible settings such that the power consumed by illumination apparatus 20 during a time period in the first time frame is reduced while ensuring the effective amount of melatonin that is necessary for a user.

In addition, in order to freely set a color temperature and an illuminance, it may be required to provide a time period in which illumination apparatus 20 emits light according to the limitations described above (that is, a time period in which the light which illumination apparatus 20 emits has high illuminance, and the color temperature of the light which illumination apparatus 20 emits is felt comfortable by an elderly person) during a predetermined time frame longer than a predetermined time period. The predetermined time frame is, for example, a time frame in which the necessity of increasing the effective amount of melatonin is high, such as the time frame from 6:00 to 10:00. That is to say, when a time period in which the color temperature of light which illumination apparatus 20 emits is set within the predetermined color temperature range described above, and the illuminance in predetermined space 50 is set within the predetermined illuminance range described above is provided longer than the predetermined time period in the time frame from 6:00 to 10:00, the color temperature of the light which illumination apparatus 20 emits is allowed to be set to a color temperature out of the predetermined color temperature range described above for a remaining time period of the first time frame, and the illuminance in predetermined space 50 is allowed to be set to an illuminance out of the predetermined illuminance range described above for the remaining time period.

As described above, the limitations that are imposed on the settings during a time frame in which the effective amount of melatonin is to be increased can improve an effect that improves a biorhythm.

Note that when no person is present in predetermined space 50, the necessity of lighting control which is performed by illumination apparatus 20 according to the limitations described above (that is, the light emitted in the lighting control has high illuminance and the color temperature of the light is felt comfortable by an elderly person) is low. Consequently, whether to perform the lighting control may be determined based on information on an action taken by a person in predetermined space 50. That is to say, whether to perform lighting control in a state in which the color temperature of light which illumination apparatus 20 emits is set within the predetermined color temperature range described above and the illuminance in predetermined space 50 is set within the predetermined illuminance range described above may be determined based on the information on an action taken by a person in predetermined space 50.

The information on an action taken by a person is, for example, information which indicates whether a person is present or not in predetermined space 50. The information on an action taken by a person is information obtained by processing an image captured in predetermined space 50 using an imaging device which is not illustrated, for example. Based on such information, illumination control unit 23 performs the lighting control when it is determined that there is a person present in predetermined space 50, and does not perform the lighting control when it is determined that there is no person present in predetermined space 50, for example.

In addition, the information on an action taken by a person may be information which indicates the number of people presents in predetermined space 50 which can be obtained from an image and the like captured using the imaging device. Based on such information, illumination control unit 23 performs the lighting control when it is determined that there is more than or equal number of people present in predetermined space 50 than a predetermined number of people, and does not perform the lighting control when it is determined that there is less number of people present in predetermined space 50 than the predetermined number of people, for example.

Furthermore, the information on an action taken by a person may be information indicating a location of a person in predetermined space 50 (information indicating whether a person is located within an area where illumination apparatus 20 illuminates) which can be obtained from an image and the like captured using the imaging device. Based on such information, for example, illumination control unit 23 performs the lighting control when it is determined that there is a person present within the area where illumination apparatus 20 illuminates, and does not perform the lighting control when it is determined that there is no person present within the area where illumination apparatus 20 illuminates.

If it is determined as to whether to perform the lighting control based on the information on an action taken by a person as described above, it prevents the lighting control to be performed unnecessarily.

CONCLUSION

As has been described above, an illumination control method performed on illumination system 100 includes: an illumination step that causes illumination apparatus 20 to illuminate predetermined space 50 with light; and a first control step that controls at least one of a color temperature of light which illumination apparatus 20 emits and an illuminance of the light which illumination apparatus 20 emits in predetermined space 50, to cause an integrated value resulting from integrating time and the effective amount of melatonin during the first time frame from 5:00 to 14:00 to be at least 10 $\mu W \cdot h/cm^2$.

Such an illumination control method can increase the amount of melatonin effective for a user, thereby adjusting a biorhythm of the user.

In addition, during the first time frame, the color temperature of the light which illumination apparatus 20 emits is at least 3000 K and at most 8000 K, and the illuminance in predetermined space 50 is at least 500 lux, for example.

Such an illumination control method can improve the degree of comfort provided for an elderly user who has a clouded crystalline lens while increasing the amount of melatonin that is effective for the elderly user.

In addition, the illumination control method further includes, for example, a second control step that controls, during a second time frame from 17:00 to 20:00, the color temperature of the light which illumination apparatus 20 emits and the illuminance in predetermined space 50 to cause the color temperature to be at least 2700 K and at most 4000 K, and the illuminance to be at least 250 lux.

Such an illumination control method can improve the degree of comfort provided for an elderly user who has a clouded and yellowed crystalline lens by preventing the elderly user from feeling a gloomy atmosphere.

In addition, during the second time frame, the color temperature of the light which illumination apparatus 20 emits is at least 3000 K and at most 3600 K, for example.

Such an illumination control method can further improve the degree of comfort provided for an elderly user who has a clouded and yellowed crystalline lens by further preventing the elderly user from feeling a gloomy atmosphere.

In addition, the illumination control method further includes, for example, a third control step that controls, during a third time frame from 20:00 onward, the color temperature of the light which illumination apparatus 20 emits and the illuminance in predetermined space 50 to cause the color temperature to be below the color temperature of the light during the second time frame, and the illuminance to be below 200 lux.

Such an illumination control method can exert positive effects on the ability to fall asleep and on the quality of the sleep for a user.

In addition, during the first time frame, the color temperature of the light which illumination apparatus 20 emits is at least 3200 K and at most 7500 K, for example.

Such an illumination control method can further improve the degree of comfort provided for an elderly user who has a clouded crystalline lens while increasing the amount of melatonin that is effective for the elderly user.

In addition, during the first time frame, the color temperature of the light which illumination apparatus 20 emits is at least 4000 K and at most 5000 K, for example.

Such an illumination control method can greatly improve the degree of comfort provided for the elderly user who has a clouded crystalline lens while increasing the amount of melatonin that is effective for the elderly user.

In addition, the illumination control method further includes, for example, a fourth control step that controls, during a fourth time frame that is between the first time frame and the second time frame, the color temperature of the light which illumination apparatus 20 emits and the illuminance in predetermined space 50 to cause the color temperature to be below the color temperature of the light during the first time frame, and the illuminance to be below the illuminance of the light during the first time frame. Furthermore, during the fourth time frame, the color temperature of the light which illumination apparatus 20 emits is at least the color temperature of the light during the second time frame, and during the fourth time frame, the illuminance in predetermined space 50 is at least the illuminance of the light during the second time frame, for example.

In such an illumination control method, the illuminance and the color temperature during the fourth time frame that is between the first time frame and the second time frame are set in between the illuminance and the color temperature during the first time frame and the illuminance and the color temperature during the second time frame, thereby preventing the elderly user from feeling unpleasant.

In addition, the illumination control method further includes, for example, a setting receiving step that receives, during the first time frame, a setting for the color temperature of the light which illumination apparatus 20 emits within a predetermined color temperature range, and a setting for the illuminance in predetermined space 50 within a predetermined illuminance range.

Such an illumination control method can receive a setting for the color temperature of light which illumination apparatus 20 emits during the first time frame within the predetermined color temperature range, and a setting for the illuminance in predetermined space 50 during the first time frame within the predetermined illumination range.

In addition, in the setting receiving step, for example, when a time period is provided longer than a predetermined time period, the color temperature of the light which illumination apparatus 20 emits is allowed to be set to a color temperature out of the predetermined color temperature range for a remaining time period of the first time frame, and the illuminance in predetermined space 50 is allowed to be set to an illuminance out of the predetermined illuminance range for the remaining time period. The time period is a time period in which the color temperature of the light which illumination apparatus 20 emits is set within the predetermined color temperature range, and the illuminance in predetermined space 50 is set within the predetermined illuminance range.

The limitations imposed on the settings as described above enable flexible settings such that the power consumed by illumination apparatus 20 during a time period in the first time frame is reduced while ensuring the effective amount of melatonin that is necessary for the elderly user.

In addition, the predetermined time period is, for example, a time period of at least 15 minutes.

The limitations imposed on the settings as described above enable flexible settings such that the power consumed by illumination apparatus 20 during a time period in the first time frame is reduced while ensuring the effective amount of melatonin that is necessary for the elderly user for the predetermined time period of at least 15 minutes.

In addition, in the setting receiving step, for example, when a time period is provided longer than a predetermined time period in a time frame from 6:00 to 10:00, the color temperature of the light which illumination apparatus 20 emits is allowed to be set to a color temperature out of the predetermined color temperature range for a remaining time period of the first time frame, and the illuminance in predetermined space 50 is allowed to be set to an illuminance out of the predetermined illuminance range for the remaining time period. The time period is a time period in which the color temperature of the light which illumination apparatus 20 emits is set within the predetermined color temperature range, and the illuminance in predetermined space 50 is set within the predetermined illuminance range.

As described above, the limitations which are imposed on the settings in the time frame from 6:00 to 10:00 where the effective amount of melatonin is to be increased can improve an effect that improves a biorhythm.

In addition, the illumination control method further includes, for example, a determining step that determines, based on information on an action taken by a person in the predetermined space, whether to perform lighting control in a state in which the color temperature of the light which illumination apparatus 20 emits is set within the predetermined color temperature range and the illuminance in predetermined space 50 is set within the predetermined illuminance range.

If it is determined as to whether to perform the lighting control based on the information on an action taken by a person as described above, it prevents the lighting control to be performed unnecessarily.

In addition, the illumination control method further includes a setting receiving step that receives, for each of the first time frame and the second time frame, a setting for the color temperature of the light which illumination apparatus 20 emits, and a setting for the illuminance in predetermined space 50.

In such an illumination control method, it is possible to individually set, for each of the first time frame and the second time frame, the color temperature of light which illumination apparatus 20 emits and the illuminance in predetermined space 50.

In addition, a predetermined color temperature range that is allowed to be set during the first time frame is different from a predetermined color temperature range that is allowed to be set during the second time frame, and a predetermined illuminance range that is allowed to be set during the first time frame is different from a predetermined illuminance range that is allowed to be set during the second time frame.

Such an illumination control method can appropriately impose a limitation to each of the first time frame and the second time frame.

In addition, the illumination control method further includes a displaying step that displays, for each of the first time frame and the second time frame, a start time, an end time, a value set for the color temperature, and a value set for the illuminance.

Such an illumination control method can display, for each of the first time frame and the second time frame, the start time, the end time, a value set for the color temperature, and a value set for the illuminance.

In addition, the illumination control method further includes a displaying step that displays a value set for the illuminance. In the displaying step, at least one of a horizontal illuminance in predetermined space 50 and a vertical illuminance in predetermined space 50 is displayed as the value set for the illuminance.

Such an illumination control method can display, as a value set for the illuminance, at least one of a horizontal illuminance in predetermined space 50 and a vertical illuminance in predetermined space 50.

In addition, illumination control apparatus 21 includes illumination control unit 23 which controls at least one of a color temperature of light which illumination apparatus 20 emits and an illuminance of the light which illumination apparatus 20 emits in predetermined space 50, to cause an integrated value resulting from integrating time and the effective amount of melatonin during the first time frame from 5:00 to 14:00 to be at least 10 $\mu$W·h/cm$^2$.

Such an illumination control method can improve the amount of melatonin effective for a user, and can adjust a biorhythm of the user.

Other Embodiment

The above has described an illumination system according to the embodiments, yet the present disclosure is not limited to the above embodiments.

For instance, a method of communication between devices which has been described above is not limited to the above embodiments. When the devices communicates wirelessly, the method used for wireless communication (communication standard) is a specific low-power radio using, for example, the frequency band of 920 MHz, such as Zigbee (registered trademark), Bluetooth (registered trademark), or a wireless local area network (LAN). In addition, the devices may perform wired communication, instead of wireless communication. Specifically, the wired communication includes power line communication, or communication using a wired LAN. There may be a relaying device between the devices for communication between the devices.

In addition, in the embodiments described above, a process performed by a particular processing unit may be performed by other processing units, for example. Furthermore, the order of processes may be changed, and the processes may be performed in parallel.

Moreover, in the embodiments described above, the illumination system is realized by a plurality of devices, but the illumination system may be realized as a single device. When the illumination system is realized by a plurality of devices, structural elements included in the illumination apparatus which have been described above may be allotted to the plurality of devices in any manner. For example, the above embodiments have described that the illumination control apparatus and the illumination apparatus are an integral device, but the illumination control apparatus and the illumination apparatus may be realized individually. In addition, the illumination control apparatus and the user interface device may be realized as an integral device, and a simple trigger transmission device (such as a typical remote controller) which only directs a start, an intermission, a restart, and a stop may also be combined to the illumination control apparatus at this time.

Furthermore, in the above embodiments, each structural element may be realized by executing a software program suitable for the structural element. Each structural element may be realized by means of a program executing unit, such as a CPU or a processor, reading and executing a software program recorded on a recording medium such as a hard disk or a semiconductor memory.

In addition, each structural element may be realized by hardware. For example, each structural element may be a circuit (integrated circuit). The circuits may be configured as one circuit as a whole or each as a separate circuit. The circuits may be general-purpose circuits or dedicated circuits.

Note that general or specific aspects of the present disclosure may be realized by a system, a device, a method, an integrated circuit, a computer program, or a computer-readable recording medium such as a CD-ROM. The general or the specific aspects of the present disclosure may also be realized by any combination of a system, a device, a method, an integrated circuit, a computer program, and a recording medium. For example, the present disclosure may be realized as a program for causing a computer to perform the illumination control method, and may also be realized as a non-transitory computer-readable recording medium on which such a program is recorded.

In addition, the present disclosure may be realized as an illumination system, a user interface device, or an illumination control apparatus. In the case of using a general-purpose information terminal, such as a smartphone or a tablet terminal, as the user interface device or the illumination control apparatus, the present disclosure may be realized as an application program for functioning the information terminal (computer) as the user interface device or the illumination control apparatus.

The present disclosure also encompasses: embodiments achieved by applying various modifications conceivable to those skilled in the art to each embodiment; and embodiments achieved by arbitrarily combining the structural elements and the functions of each embodiment without departing from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. An illumination control method, comprising:
causing an illumination apparatus to illuminate a predetermined space with light;
controlling at least one of a color temperature of light which the illumination apparatus emits and an illuminance of the light which the illumination apparatus emits in the predetermined space, to cause an integrated value to be at least 10 $\mu$W·h/cm$^2$, the integrated value being a value resulting from integrating time and an effective amount of melatonin during a first time frame from 5:00 to 14:00; and
receiving, from a user, at least one of a setting for the color temperature of the light which the illumination apparatus emits during the first time frame and a setting for the illuminance in the predetermined space during the first time frame, wherein
in the receiving, only a setting that causes the integrated value to be at least 10 $\mu$W·h/cm$^2$ during the first time frame is allowed.

2. The illumination control method according to claim 1, wherein
during the first time frame, the color temperature of the light which the illumination apparatus emits is at least 3000 K and at most 8000 K, and
during the first time frame, the illuminance in the predetermined space is at least 500 lux.

3. The illumination control method according to claim 1, further comprising:
controlling, during a second time frame from 17:00 to 20:00, the color temperature of the light which the illumination apparatus emits and the illuminance in the predetermined space to cause the color temperature to be at least 2700 K and at most 4000 K, and the illuminance to be at least 250 lux.

4. The illumination control method according to claim 3, wherein during the second time frame, the color temperature of the light which the illumination apparatus emits is at least 3000 K and at most 3600 K.

5. The illumination control method according to claim 3, further comprising:
controlling, during a third time frame from 20:00 onward, the color temperature of the light which the illumination apparatus emits and the illuminance in the predetermined space to cause the color temperature to be below the color temperature of the light during the second time frame, and the illuminance to be below 200 lux.

6. The illumination control method according to claim 3, wherein
in the receiving, for each of the first time frame and the second time frame, a setting for the color temperature of the light which the illumination apparatus emits, and a setting for the illuminance in the predetermined space are received.

7. The illumination control method according to claim 6, wherein
a predetermined color temperature range that is allowed to be set during the first time frame is different from a predetermined color temperature range that is allowed to be set during the second time frame, and
a predetermined illuminance range that is allowed to be set during the first time frame is different from a predetermined illuminance range that is allowed to be set during the second time frame.

8. The illumination control method according to claim 6, further comprising:
displaying, for each of the first time frame and the second time frame, a start time, an end time, a value set for the color temperature, and a value set for the illuminance.

9. The illumination control method according to claim 1, wherein during the first time frame, the color temperature of the light which the illumination apparatus emits is at least 3200 K and at most 7500 K.

10. The illumination control method according to claim 1, wherein during the first time frame, the color temperature of the light which the illumination apparatus emits is at least 4000 K and at most 5000 K.

11. The illumination control method according to claim 1, wherein,
in the receiving, during the first time frame, a setting for the color temperature of the light which the illumination apparatus emits within a predetermined color temperature range, and a setting for the illuminance in the predetermined space within a predetermined illuminance range are received.

12. The illumination control method according to claim 11, wherein
in the receiving, when a time period is provided longer than a predetermined time period, the color temperature of the light which the illumination apparatus emits is allowed to be set to a color temperature out of the predetermined color temperature range for a remaining time period of the first time frame, and the illuminance in the predetermined space is allowed to be set to an illuminance out of the predetermined illuminance range for the remaining time period, the time period being a time period in which the color temperature of the light which the illumination apparatus emits is set within the predetermined color temperature range, and the illuminance in the predetermined space is set within the predetermined illuminance range.

13. The illumination control method according to claim 12, wherein the predetermined time period is a time period of at least 15 minutes.

14. The illumination control method according to claim 12, wherein
in the receiving, when a time period is provided longer than a predetermined time period in a time frame from 6:00 to 10:00, the color temperature of the light which the illumination apparatus emits is allowed to be set to a color temperature out of the predetermined color temperature range for a remaining time period of the first time frame, and the illuminance in the predetermined space is allowed to be set to an illuminance out of the predetermined illuminance range for the remaining time period, the time period being a time period in which the color temperature of the light which the illumination apparatus emits is set within the predetermined color temperature range, and the illuminance in the predetermined space is set within the predetermined illuminance range.

15. The illumination control method according to claim 12, further comprising:
determining, based on information on an action taken by a person in the predetermined space, whether to perform lighting control in a state in which the color temperature of the light which the illumination apparatus emits is set within the predetermined color temperature range and the illuminance in the predetermined space is set within the predetermined illuminance range.

16. The illumination control method according to claim 11, further comprising:
displaying a value set for the illuminance, wherein
in the displaying, at least one of a horizontal illuminance in the predetermined space and a vertical illuminance in the predetermined space is displayed as the value set for the illuminance.

17. A non-transitory computer-readable recording medium for use in a computer, the recording medium having a computer program recorded thereon for causing the computer to execute the illumination control method according to claim 1.

18. An illumination control method comprising:
causing an illumination apparatus to illuminate a predetermined space with light;
controlling at least one of a color temperature of light which the illumination apparatus emits and an illuminance of the light which the illumination apparatus emits in the predetermined space, to cause an integrated value to be at least 10 $\mu W \cdot h/cm^2$, the integrated value being a value resulting from integrating time and an effective amount of melatonin during a first time frame from 5:00 to 14:00, and
controlling, during a third time frame that is between the first time frame and a second time frame from 17:00 to 20:00, the color temperature of the light which the illumination apparatus emits and the illuminance in the predetermined space to cause the color temperature to be below the color temperature of the light during the first time frame, and the illuminance to be below the illuminance of the light during the first time frame.

19. The illumination control method according to claim 18, wherein
during the third time frame, the color temperature of the light which the illumination apparatus emits is at least the color temperature of the light during the second time frame, and during the third time frame, the illuminance in the predetermined space is at least the illuminance of the light during the second time frame.

20. An illumination control apparatus, comprising:
an illumination control unit configured to control at least one of a color temperature of light which an illumination apparatus emits and an illuminance of the light which the illumination apparatus emits in a predetermined space, to cause an integrated value to be at least 10 $\mu$W·h/cm$^2$, the integrated value being a value resulting from integrating time and an effective amount of melatonin during a first time frame from 5:00 to 14:00,
wherein at least one of a setting for the color temperature of the light which the illumination apparatus emits during the first time frame and a setting for the illuminance in the predetermined space during the first time frame is input to the illumination control apparatus by a user, and
only a setting that causes the integrated value to be at least 10 $\mu$W·h/cm$^2$ during the first time frame is allowed.

\* \* \* \* \*